Patented Dec. 26, 1922.

1,440,253

UNITED STATES PATENT OFFICE.

JOHN T. TRAVERS, OF COLUMBUS, OHIO.

METHOD OF TREATING POLLUTED LIQUID.

No Drawing.   Application filed May 15, 1920.   Serial No. 381,669.

*To all whom it may concern:*

Be it known that JOHN T. TRAVERS, a citizen of the United States, residing at Columbus, in the county of Franklin and State of Ohio, has invented certain new and useful Improvements in Methods of Treating Polluted Liquid, of which the following is a specification.

This invention relates to an improved method of handling or treating polluted waters, such as domestic sewage or factory or industrial waste of a liquid character, wherein feculent conditions obtain, for the purpose of clarifying and purifying such waste or liquids by removing or separating the polluting matter therefrom, in order that the liquid or water so treated may be harmlessly discharged into a natural stream or other body of water without involving injurious consequences of any nature to the fish, animal or plant life existing in or using such streams.

In accordance with the present invention, I take such industrial or other waste, which is in liquid form and apply thereto a compound consisting of suitable quantities of marl lime, or marl clay as the substance is commercially termed, and also proportionate quantities of hydrated lime or calcium oxide, together with ferrous sulphate or sulphate of iron. I employ a mixture which consists of marl clay and hydrated lime or calcium oxide and ferrous sulphate or sulphate of iron in proper proportions, the proportions being determined by the situation or circumstances surrounding the liquid treated in each case. The compound which I use, namely, the combined marl clay, hydrated lime or calcium oxide and ferrous sulphate or sulphate or iron is applied to organic polluted water or liquid waste in amounts varying from 20 to 200 grains per gallon, the amount necessary to employ depending upon the amount of solids contained in the liquid treated, as will be clearly understood. Thus, waste containing dyes require more of the compound, whereas domestic sewage will require considerably less.

The addition of the compound above described to the polluted liquids has the effect of causing coagulation of the impurities contained therein within the liquids; or, in other words, the application of the compound to, or the mixture of the same with, the solid particles of or in the liquids causes such particles to assume a flaky physical condition, so that the specific gravity of such combined impurities or solids will be increased to an extent permitting the same to be rapidly precipitated in well defined form to the bottom of the receptacle in which the liquids are contained. By so treating the liquids the clarified and purified part thereof may be drawn off from the precipitated solids and discharged in any desired manner into a suitable outlet. If the latter happens to be a stream, river or other body of water, the same will not in any way be contaminated by the liquid thus discharged therein.

It is well known that industrial waste liquids, particularly those of paper manufacturing concerns, leather works, and other industries, are very obnoxious and impure, and if permitted to escape while polluted, will pollute and contaminate the body of water into which they are discharged, thereby rendering such water impure for all purposes and distinctly detrimental to fish and animal life. To overcome this condition it has been a common practice to subject the liquids to the action of quicklime; however, this latter process, while now in general use, is objectionable in many particulars, since, because of its caustic action, the liquids or waste treated thereby and therewith tend to dissolve organic matter contained therein, thus permitting the organic matter to be carried off with the apparently purified water, so that stream contamination will still result. However, by the use of my compound above described, it will be impossible to put so great a quantity thereof into the polluted water as to make the clarified water treated thereby dangerous to fish or animal life, as the calcium carbonate content thereof will not dissolve readily unless it is in contact with polluted water that possesses an excess of organic matter. In other words, just so long as the compound can cambine with water containing organic matter the calcium carbonate contained therein will be dissolved, but when the organic matter has been precipitated and removed from the liquid by such precipitation, the calcium carbonate becomes relatively inactive. To the best of my knowledge the use of a compound as above described, in connection with a method of this character, is novel and by results obtained the same is believed to be more efficient than other materials heretofore employed in analogous methods, in that the process of separating or removing the impurities from the liquid waste is appreciably expedited, rendered more economical, and the liquid obtained therefrom is of a purer quality. It has been found that the addition of the compound as described tends to generate a carbon dioxide gas within the polluted liquids, which passes completely through the latter, permitting the gases released from the impurities in the water to be rapidly carried off and released from the liquid at its surface.

The method disclosed is adapted for the purification of industrial waste liquids and domestic sewage generally and is not confined, as are many previous methods, to any one or two kinds of polluted water; but, on the contrary, will react just as readily and efficiently on all manner of polluted water and purify the same irrespective of the fact that the latter may possess an alkaline reaction, or an acid reaction, or merely a plain organic pollution. Marl clay is a natural element entering into the making of various fertilizers, hence its use in combination with the precipitate increases the value of the latter as a by-product and renders the same suitable for commercial use. The simple manner in which the marl clay can be applied constitutes an improvement over prior treatments, since the use of the marl clay in combination with hydrated lime or calcium oxide and ferrous sulphate or sulphate of iron does not require slacking, as is the case in quicklime treatments. Moreover, no risk is taken if, by carelessness or inadvertence, a too great quantity of the compound is placed in the polluted liquids, since the excess of the compound will have no detrimental effect upon the discharged liquid as would be the case if quicklime were to be employed. The above compound, omitting the ferrous sulphate or sulphate of iron, acts just as efficiently on an acidic solution, such as is commonly discharged from steel mills, where such waste contains substantially 1% per volume of acid. The ingredients serve to neutralize the acid contained in the waste and to precipitate the dissolved iron content to the bottom of the receptacle in complete separation from the liquid proper. It will also neutralize copperas water, coal mine drainage, and other waste liquids of an acidic character.

What is claimed is:

1. The herein described method of treating polluted liquid, consisting in mixing with the liquid, a compound containing marlaceous material, lime and an added coagulant.

2. The method of treating and purifying polluted waste liquids containing organic matter, which consists in subjecting such liquids to the action of a composition consisting of marl clay, lime and a ferrous sulphate.

3. The method of treating and purifying polluted waste liquids containing organic substances, which consists in subjecting such liquids to the action of a composition consisting mainly of marl clay, with an appreciable smaller quantity of lime, together with ferrous sulphate.

4. The method of treating and purifying polluted waste liquids, which consists in subjecting such liquids to the action of a composition composed mainly of marl clay in conjunction with lime, together with ferrous sulphate.

In testimony whereof I affix my signature.

JOHN T. TRAVERS.